May 5, 1942. R. W. JORGENSEN 2,282,136
AUTOMOBILE HEADLIGHT SHADE
Filed Oct. 9, 1940
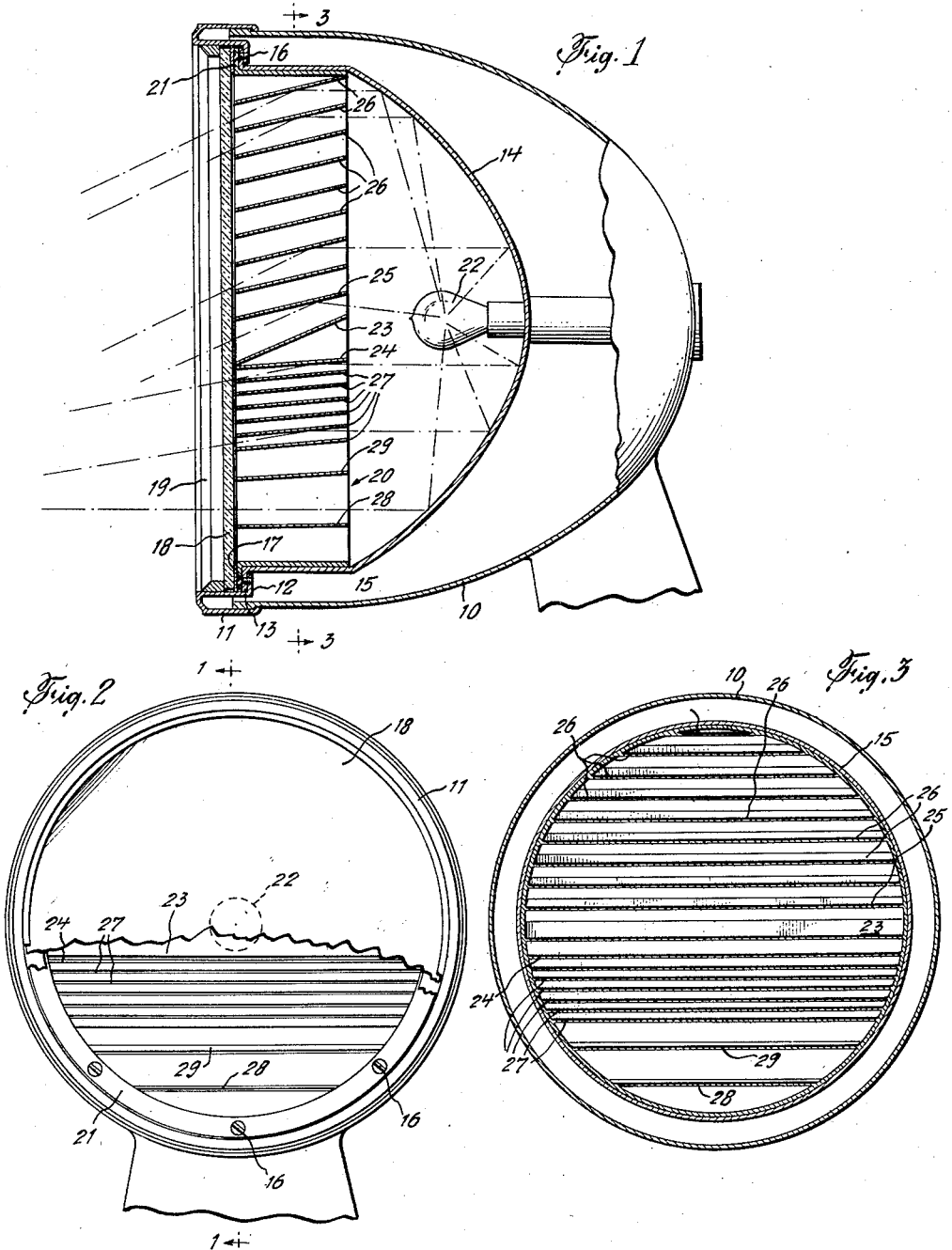
INVENTOR.
RICHARD W. JORGENSEN
BY
ATTORNEY.

Patented May 5, 1942

2,282,136

UNITED STATES PATENT OFFICE 2,282,136

AUTOMOBILE HEADLIGHT SHADE

Richard W. Jorgensen, Palos Park, Ill.

Application October 9, 1940, Serial No. 360,369

1 Claim. (Cl. 240—48.4)

This invention relates to automobile headlights, and one object is to provide headlight shades so constructed and arranged that they will eliminate all glare or direct light from the headlights toward on-coming drivers while at the same time projecting ample and strong light on the road in front of the automobile for a substantial distance ahead. The invention, as applied to headlight lamps, will shield on-coming drivers from direct light from the lamps for a distance of 300 to 500 feet ahead. Such shades as presented herein may also be well applied to other lamps wherein it is desired to eliminate direct light or glare from reaching the eyes.

Another object of the invention is the provision of a lamp equipped with the shades abovementioned, which is inexpensive in cost of manufacture, simple in construction, and of a very high degree of efficiency in use.

The above and other objects will become apparent in the description below, in which reference is had to the accompanying drawing, forming a part hereof and serving to illustrate one manner in which the purposes of the invention may be carried out.

Referring briefly to the drawing, Figure 1 is a side elevational view, partly in cross-section on the line 1—1 of Figure 2, showing the shade mounted in an automobile head lamp.

Figure 2 is a front view of the same, with the lens partly broken away to show the shade therebehind.

Figure 3 is a cross-sectional view taken on the line 3—3 of Figure 1.

Referring in detail to the drawing, the numeral 10 indicates the housing of a head lamp, having the snap-on rim 11 encircling its open periphery. In the type of lamp construction illustrated, the rim 11 is provided with an inwardly extending internal flange 12, against the front surface of which the peripheral flange 13 of the lamp reflector 14, registers. This type of construction is shown, as are the other elements of the lamp hereinafter to be described, for purposes of illustration only, as the details of construction of such lamps vary greatly, and such details form no part of the present invention.

The forward portion 15 of the reflector 14, just rearward of the flange 13, is formed cylindrically, as shown. To complete the description of the lamp per se before going into the application of the present invention thereto, peripherally arranged screws 16 removably lock the flanges 12 and 13 together. A gasket 17 lies against the front surface of the flange 13, and the headlight lens 18 rests against this gasket, being retained in place, in the construction illustrated, by a lock ring 19 which fits snugly within the forwardly-projecting periphery of the rim 11.

The shade attachment for this lamp comprises essentially a cylinder 20 having at its forward end an outwardly-extending flange 21. With the lock ring 19, lens 18, and gasket 17 removed, the cylinder 20 is inserted into the reflector 14 and when its flange 21 rests against the reflector flange 13, the cylinder 20 registers snugly within the cylindrical portion 15 of the mirror 14. The flange 21 is, of course, provided with peripheral holes in alignment with similar holes through the flanges 12 and 13, and the screws 16 are passed through these aligned holes, thus tying the three flanges together. After the shade cylinder 20 has thus been mounted in position, the gasket, lens, and locking ring are reassembled.

Mounted within the cylinder 20 are a plurality of transverse webs, as follows. The lamp bulb 22 is usually situated at the diametrical or axial center of the reflector 14. All of the webs, it is to be noted, extend downwardly at an angle in a forward direction. One web 23 extends from a horizontal level just slightly above the level of a horizontal plane through the axis of the bulb, at a relatively sharp angle downward and forward, so that the front edge of this web is at a horizontal level below that of a horizontal plane through the bottom-most point of the bulb 22. Directly beneath the web 23 is a web 24 which extends forward at but a slight downward angle and has its front edge in contact with the front edge of the web 23. A third web 25, positioned above the web 23, extends forward at a downward slope which is intermediate between the angularity of the webs 23 and 24, and its forward edge lies in the horizontal plane through the axis of the bulb. It is thus apparent that rays from the bulb are obscured from the eyes of a person standing with his eyes at or near the horizontal plane through the bulb.

Above the web 25 are a plurality of spaced webs 26 all mutually parallel with the web 25. Below the web 24 are, similarly, a plurality of spaced webs 27, all mutually parallel with the web 24. The spaces between the webs 25 and 26 are greater than those between the webs 24 and 27, as shown.

Adjacent and just above the bottom of the cylinder 20, is a web 28 which slopes forward at a very slight angle, so that it is nearly horizontal. Between the web 28 and the lowermost web 27, is a web 29 whose slope is intermediate between that of the web 28 and the webs 27. The vertical distances between the webs 28 and 29, as well as those above the web 29 and below the web 28, are greater than the distances between the various webs 27 and those between the webs 26.

As is evidenced by the broken lines in Figure 1, which serve to represent rays from the bulb 22 to the webs and reflected rays from the reflector 14 and from the webs, it is impossible for direct light from the bulb or light reflected directly from the reflector 14, to reach the eyes of an on-coming driver, as all the rays upon leaving the lamp are directed in a downward direction. The most that the on-coming driver will see is a well-diffused bright glow of light. The webs and the interior of the cylinder 15 may be silvered or otherwise highly polished so that they may reflect a maximum amount of light from the bulb and reflector, and of course both the cylinder and the webs may be made of any suitable or desirable material. The webs may either be integral with the cylinder 15, or they may be made separately securable thereto. The entire shade, however, comprising the cylinder 20, and the webs contained therein, is a single unit which may be readily inserted into or removed from the lamp housing, as stated and described. If it should at any time be desired to have the lamp give up its maximum of light without regard to the glare factor, the shade unit may be easily removed, as above-set forth. Likewise, it may be readily installed in any lamp mirror of the type shown.

Obviously, modifications in form and structure may be made without departing from the spirit and scope of the invention.

I claim:

In combination with the reflector shell of a headlamp or the like, a shade comprising a substantially cylindrical member insertable and registering in said shell, said member having a plurality of transverse webs extending thereacross, that group of said webs above a horizontal plane through the axis of said member being mutually parallel and sloping downward toward the front at a substantially large angle, the other group of said webs below said plane being mutually parallel and sloping downward toward the front at a smaller angle, a third web mounted intermediate the lowermost of said upper group of webs and the topmost of said lower group of webs, said third web having its rear edge substantially in said plane and sloping downward toward the front and having its forward edge in linear contact with the forward edge of said topmost web of said lower group.

RICHARD W. JORGENSEN.